(12) United States Patent
Schneider et al.

(10) Patent No.: US 8,740,195 B2
(45) Date of Patent: *Jun. 3, 2014

(54) SYSTEMS AND METHODS FOR DIFFUSING GAS INTO A LIQUID

(71) Applicants: Jakob H. Schneider, Calgary (CA); Joseph Mark Schneider, Fonthill (CA)

(72) Inventors: Jakob H. Schneider, Calgary (CA); Joseph Mark Schneider, Fonthill (CA)

(*) Notice: Subject to any disclaimer, the term of this patent is extended or adjusted under 35 U.S.C. 154(b) by 34 days.

This patent is subject to a terminal disclaimer.

(21) Appl. No.: 13/678,444

(22) Filed: Nov. 15, 2012

(65) Prior Publication Data

US 2013/0163372 A1 Jun. 27, 2013

Related U.S. Application Data

(60) Continuation-in-part of application No. 13/620,069, filed on Sep. 14, 2012, now Pat. No. 8,567,769, which is a division of application No. 12/162,603, filed on Jul. 29, 2008, now Pat. No. 8,267,381.

(30) Foreign Application Priority Data

Jan. 31, 2007 (CA) .................................... 2534704
Jan. 31, 2007 (WO) ................ PCT/CA2007/000160

(51) Int. Cl.
*B01F 1/00* (2006.01)

(52) U.S. Cl.
USPC ..................... 261/122.1; 261/119.1; 261/124; 239/403

(58) Field of Classification Search
USPC ............. 261/119.1, 122.1, 124; 239/399, 403
See application file for complete search history.

(56) References Cited

U.S. PATENT DOCUMENTS

| 4,215,081 A | 7/1980 | Brooks |
| 4,279,743 A | 7/1981 | Miller |
| 4,397,741 A | 8/1983 | Miller |
| 4,399,027 A | 8/1983 | Miller |
| 4,744,890 A | 5/1988 | Miller et al. |
| 4,838,434 A | 6/1989 | Miller et al. |
| 4,997,549 A | 3/1991 | Atwood |
| 5,049,320 A | 9/1991 | Wang et al. |
| 5,192,423 A | 3/1993 | Duczmal et al. |
| 5,529,701 A | 6/1996 | Grisham et al. |
| 5,531,904 A | 7/1996 | Grisham et al. |
| 6,106,711 A | 8/2000 | Morse et al. |
| 6,878,188 B2 | 4/2005 | Yi |
| 6,918,949 B1 | 7/2005 | Peters |
| 8,267,381 B2 | 9/2012 | Schneider |

FOREIGN PATENT DOCUMENTS

CA 2534704 7/2007
WO WO 2007/087724 8/2007

*Primary Examiner* — Christopher P Jones
(74) *Attorney, Agent, or Firm* — David B. Tingey; Bryant J. Keller; Kirton McConkie

(57) ABSTRACT

Systems and methods for diffusing gas into a liquid are disclosed. In some cases, the methods include tangentially introducing a liquid into a cylindrical chamber having a cylindrical inner wall such that the liquid develops a spiral flow. In some cases, gas bubbles are orthogonally introduced into the liquid as the liquid flows through the chamber. In some cases, a flow of the liquid and the gas bubbles is controlled such that a ratio of a liquid flow rate to a gas bubble flow rate does not exceed values which convert non-bacteria enriched, clear water into froth. In such cases, a mixture of the liquid and the gas bubbles to exit the chamber near an output end. While the liquid can include clear water, in some instances, the liquid also includes bacteria (e.g., surfactant-producing or non-surfactant-producing bacteria) and/or bacterial nutrients that allow for improved bioremediation.

23 Claims, 3 Drawing Sheets

SYSTEMS AND METHODS FOR DIFFUSING GAS INTO A LIQUID

RELATED APPLICATION

This is a continuation-in-part patent application of U.S. patent application Ser. No. 13/620,069, now U.S. Pat. No. 8,567,769 B2, entitled "APPARATUS AND METHOD OF DISSOLVING GAS INTO A LIQUID," filed on Sep. 14, 2012, which is a divisional patent application of U.S. patent application Ser. No. 12/162,603, now U.S. Pat. No. 8,267,381, entitled "APPARATUS AND METHOD OF DISSOLVING GAS INTO A LIQUID," filed on Jul. 29, 2008, which claims priority to PCT/CA2007/000160 and to Canadian Application No. 2534704, filed on Jan. 31, 2007; the entire disclosures of which are all incorporated hereby in their entirety.

BACKGROUND OF THE INVENTION

1. Field of the Invention

The present invention relates to systems and methods for diffusing gas into a liquid by creating and maintaining conditions that create a mixture of the liquid and bubbles of the gas. In some non-limiting implementations, the described systems and methods also include adding bacteria and/or bacterial nutrients to the liquid.

2. Background and Related Art

Aeration plays important roles in many industries where process efficiency depends on a concentration of oxygen in the processed liquid (i.e., brewing, environmental services, waste-water treatment, farming, fishery, and/or mineral processing). Some traditional methods of creating conditions for aeration include the use of simple aerated tanks, spray towers, bubble-tray columns, and packed columns to create a gas-liquid interface. Often traditional aeration technology uses counter-current flow methods and multiple stages that allow the gas to be absorbed in the desired liquid. While these traditional methods and associated apparatus do achieve aeration, they can be inefficient, requiring long processing times and, hence, large equipment volumes. The inefficiency associated with some traditional approaches arises largely from the relatively low gas-liquid interfacial area to volumes provided by the equipment.

It has been suggested that improved aeration performance may be achieved through the use of an air-sparged hydrocyclone similar to designs used in the mineral processing industry for separation of solid particles from an aqueous suspension. Often such air-sparged hydrocyclones are based on the concept of passing bubbles of air through a suspension of solid particles so that hydrophobic particles attach to air bubbles and form a cohesive froth that may be removed from the separation vessel. In other words, the design of such air-sparged hydrocyclones is often concerned with the creation of gas-liquid contact conditions that are favorable for efficient particle to bubble interaction and separation with mass transfer.

In addition, various methods of, and apparatus for, removing volatile content ("VCs") from water and other liquids have been known and used in the prior art for a number of years. One of the traditional approaches, generally referred to as "air stripping", removes VCs from a contaminated liquid by passing a stream of clean air or other gas through the water or other liquid so that VCs transfer from the liquid to the gas and may be removed from the system with the exiting gas. The operating parameters of some such air stripping devices are selected to optimize the overall efficiency of both mass transfer between gas dissolved in the liquid phase and gas passing through the liquid. Additionally, the flow rate of liquid in some such devices needs to be set to produce centrifugal force fields with radial accelerations between 400 Gs and about 1500 Gs, compared to accelerations of about 70 Gs used for particle separation.

In general, some methods of air-stripping, dynamically mix gas bubbles with liquid (thereby rapidly replenishing the supply of molecules of the transferring component in immediate proximity to the gas-liquid interface and minimizing mass diffusion limitations on transfer rate), optimize the contact time between bubbles and liquid (thereby allowing material transfer to reach or closely approach equilibrium), and cleanly separate post-contact gas and liquid streams (thereby minimizing regressive transfer). In many such methods, the objective is to maximize gas velocity flowing through the liquid and diverting both phases (liquid and gas) at the apparatus exit. If a large volume of gas passes through the unit of liquid, then mass transfer of gas dissolved in liquid into passing gas is maximized, increasing overall gas stripping efficiency. Accordingly, some such devices work in the regime of very high Gs, promoting movement of gas from liquid to gas—but not in reverse.

In addition to the aforementioned methods for aerating, removing contaminants from, and otherwise treating liquids, some conventional methods for treating contaminated liquids (e.g., water comprising hydrocarbons from an oil spill) involve applying synthetic, petroleum-based chemical surfactants to the liquid. While such surfactants may act to emulsify contaminants in the liquid, and thereby allow such contaminants to mix and disperse, such surfactants are often toxic to humans, animals, and the environment and can even be non-biodegradable.

Thus, while techniques currently exist that are used to aerate liquids and to treat liquids (such as contaminated water), challenges still exist, including those discussed above. Accordingly, it would be an improvement in the art to augment or even replace current techniques with other techniques.

SUMMARY OF THE INVENTION

The present invention relates to systems and methods for diffusing gas into a liquid by creating and maintaining conditions to create a mixture of the liquid and bubbles of the gas. In some non-limiting implementations, the described systems and methods also include adding bacteria and/or bacterial nutrients to the liquid (e.g., to assist in bioremediation). In this regard, the term bacterial nutrients may be used herein to refer to one or more nutrients necessary for, or useful to, the survival and/or growth of bacteria.

In at least some non-limiting implementations, the described systems and methods include introducing a stream of a liquid into a cylindrical chamber having a cylindrical inner wall, and enclosed at a first end, the stream being introduced tangentially at an input zone near the first end of the chamber in a manner to develop a spiral flow of the stream along the cylindrical inner wall toward an opposite, output end of the chamber. In some implementations, the described systems and method further include introducing gas into the stream during at least a portion of its travel in the chamber, the gas being introduced to the stream orthogonally through means located at the chamber inner wall for developing gas bubbles which move into the stream. Moreover, some implementations involve controlling a flow of liquid and gas bubbles so that a ratio of liquid flow rate to gas bubble flow rate does not exceed values which convert non-bacteria enriched, clear water into froth. In some instances, the chamber is of a length sufficient to provide a residence time in the chamber which permits a diffusion of the gas in the liquid, and the chamber is configured to allow a mixture of the liquid and the gas bubbles to exit the chamber near the output end.

Although the described systems and methods can use any suitable liquid and gas, in some non-limiting implementations, the liquid comprises a clear water (e.g., filtered water, well water, potable water, etc.) and the gas comprises oxygen, ozone, and/or another gas that is suitable for promoting bacterial growth (e.g., of oil-eating bacteria) or otherwise increasing contaminant degradation/removal.

While any other suitable ingredient can be added to the liquid stream (e.g., before, during, and/or after it passes through the chamber), in some non-limiting implementations, bacteria (e.g., surfactant-producing and/or non-surfactant-producing bacteria) are added to the stream. In some implementations in which the liquid stream comprises surfactant-producing bacteria, the bacteria produces a surfactant that alters the surface tension of the liquid and allows the mixture of liquid and gas bubbles that exits the chamber to include a relatively dense and stable froth. In contrast, in some implementations in which the liquid stream comprises non-surfactant-producing bacteria, the mixture of liquid and gas bubbles that exits the chamber is relatively free from froth.

In some cases, in order to improve bacterial growth (e.g., of bacteria in the stream and/or bacteria at an application site), bacterial nutrients are optionally added to the liquid stream. Similarly, any other suitable ingredient can be added to the liquid stream that allows mixture of liquid and gas bubbles that exits the chamber to perform a desired purpose. Some examples of such ingredients include, without limitation, one or more yeasts, fungi, bacteria, disinfectants, gas, aerosols, conditioners, degreaser, soaps, aromatic conditioners, polymers, frothers, and/or pH altering chemicals.

While the methods and processes of the present invention have proven to be particularly useful in the area of bioremediation of hydrocarbon contaminants, those skilled in the art can appreciate that the described systems and methods can be used in a variety of different applications and in a variety of different areas of manufacture to treat a desired application site and/or contaminant.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

Figure 1:
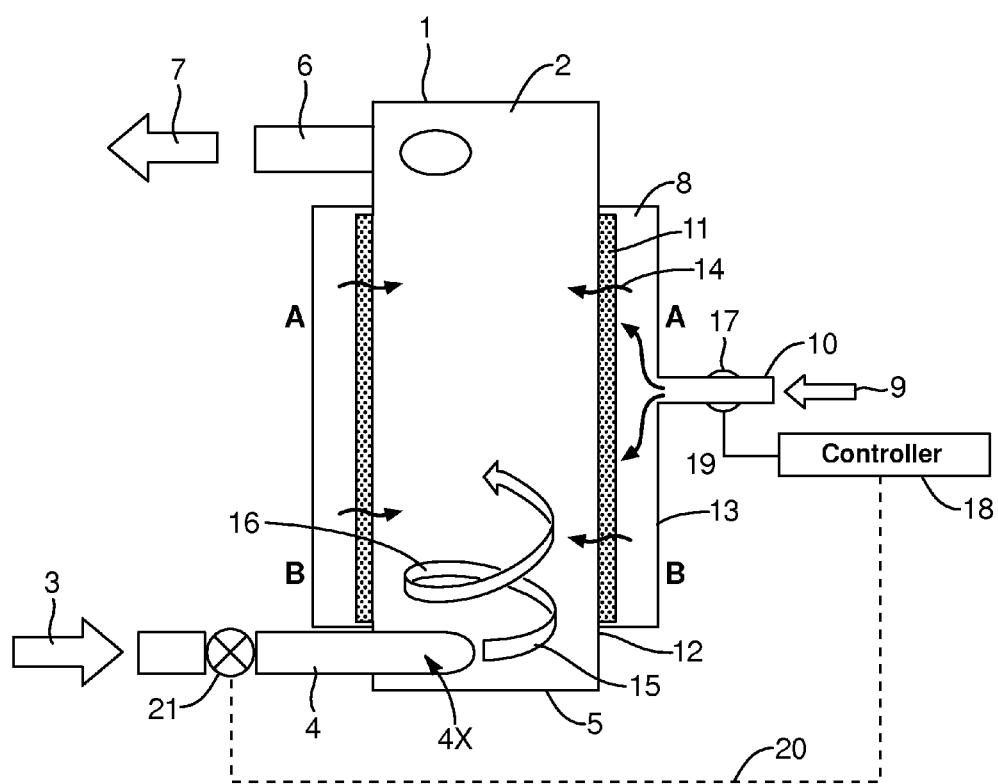
FIG. 1 is a schematic view of a representative embodiment of an apparatus for dissolving gas in a liquid.

The present invention relates to systems and methods for diffusing gas into a liquid by creating and maintaining conditions that, by mixing, create a mixture of the liquid and bubbles of the gas. In some non-limiting embodiments, the described systems and methods also include adding bacteria and/or bacterial nutrients to the liquid.

As used herein, the term liquid may refer to any suitable liquid or liquids that can be introduced into the described apparatus and be mixed with a gas. Some non-limiting examples of such liquids include clear water, namely a substantially pure water comprising $H_2O$, such as water that is substantially free from surface-active materials (such as polymers, surfactants, and/or other materials that tend to decrease surface tension when added to pure water), including, without limitation, water that is potable for general human consumption, certain filtered water, spring water, etc.; irrigation water; ground water (e.g., water from hyporheic zones, aquiphers, etc.); surface water (e.g., water from rivers, streams, etc.); sea water (e.g., sea water, sea water that has been desalinized, etc.); run-off water (e.g., agricultural run-off, meat-processing plant run-off, feedlot run-off, etc.); frac'ing effluent; waste water (e.g., sewage, post-anaerobic digested sludge water, etc.); contaminated water (e.g., water comprising one or more hydrocarbons, forms of bacteria, heavy metals, etc.); all liquids that cannot be identified as water (including, without limitation, milk, oils, gasoline, and their derivatives, fruit juices, vegetable juices, and liquids comprising water and additives); and/or any other suitable liquid. In some embodiments, however, the liquid comprises clear water. As used herein, the term gas may be used to refer to any suitable gas or gasses that can be mixed and/or diffused within the liquid through the described systems and methods. In some non-limiting embodiments, the gas comprises ambient air, oxygen, ozone, carbon dioxide, aerosol, methane, and/or any other suitable chemical in a gaseous state that can be diffused into the liquid, including partial diffusion. Indeed, in some embodiments, in order to promote growth of desired bacteria (as discussed below), the gas comprises one or more gases that are beneficial to such bacteria. Some non-limiting examples of such gases include oxygen, gases containing bacterial nutrients, and/or ozone.

The described methods for diffusing the gas into the liquid can be performed with any suitable device or system that is capable of mixing bubbles of the gas with the liquid in a spiral flow such that a ratio of a liquid flow rate to a gas bubble rate does not exceed values that convert non-bacteria enriched, clear water into a froth and which allow a mixture of the liquid and the gas bubbles to exit the device. As used herein, the term non-bacteria enriched, clear water may be used to refer to clear water that has not had significant amounts of bacteria added thereto. Additionally, as used herein, the term froth may refer to a relatively stable and dense foam in which the voids between the bubbles of gas contain either liquid or gas to varying degrees.

One non-limiting illustration of an apparatus 1 for performing the described methods is shown in FIG. 1. Although the apparatus 1 can comprise any suitable component or characteristic that allows it to function as described herein, in some embodiments, the apparatus comprises a cylindrical chamber 2. While the liquid can flow through the chamber 2 in any suitable manner, in some embodiments, in order to form a liquid stream 15 within the apparatus 1, the liquid is introduced into the apparatus 1 in the direction of arrow 3, through a conduit 4, and into the chamber 2, via an entry port 4x that is positioned tangentially, relative to the chamber 2. In some embodiments, a first end 5 of the chamber 2 is closed so that the liquid stream 15 flows in the direction of arrow 7 from an exit port 6 located at an output end, which exit port 6 (in turn) can be oriented or of such size and shape as to discharge the liquid stream 15 along various angles outside of the chamber 2, such as directly or tangentially (as shown in FIG. 1).

The liquid can be introduced into the apparatus 1 at any suitable speed and/or pressure that allows the apparatus to function as described herein. In some embodiments, however, the liquid is introduced with flow velocity sufficient to generate centrifugal forces of a vortex 16 to extend the diffusion rate within the chamber 2 of apparatus 1.

While the liquid stream 15 can have any suitable flow rate within the chamber 2, in some embodiments, the velocity of the liquid stream 15 is sufficient to achieve centrifugal forces that are between about 100 and about 300 Gs.

In some embodiments, as the liquid stream 15 progresses along an inner surface 12 of the chamber 2, one or more gases are introduced into the liquid. While this gas can be introduced into the liquid in any suitable direction, in some embodiments, the gas is introduced orthogonally into the liquid stream 15.

While the gas can be introduced into the liquid stream 15 in any suitable manner, and through any suitable means, in some embodiments, the gas is introduced through a porous wall 11. Additionally, although this porous wall 11 can be disposed in any suitable location, in some instances, the porous wall 11 is substantially flush with a portion of the inner surface 12 of the chamber 12 to define a continuing inner surface.

The porous wall 11 can be constructed of any suitable known or novel materials that allow the apparatus 1 to function in the manner described herein. Indeed, in some instances, the porous wall 11 comprises a fine mesh (e.g., the fine mesh 23, discussed below with reference to FIG. 2) and/or a screen product having a rigidity that defines a reasonably smooth surface to maintain a swirling flow of the liquid stream 15. In this regard, a variety of screen meshes are available which will provide such porosity. Moreover, other suitable materials that can be used for the porous wall 11 include, but are not limited to, sintered porous materials of metal oxides or porous ceramics that have the necessary structural strength yet provide a relatively smooth surface, and sintered, porous, stainless steel of controlled porosity.

The porous wall 11 can also have any suitable pore size that allows the gas to bubble through the porous wall 11 into the liquid stream 15. In many cases, the rate of gas diffusion into the liquid is favored by maximizing the relative area to liquid and gas volumes, meaning that it can be favorable to generate (e.g., via the porous wall 11) very small diameter bubbles with narrow size distribution. When very small bubble size and narrow size distribution is achieved, then a high gas to liquid volume ratio is achieved. The smaller the bubble, the bigger the gas volume that can be packed into the unit volume with a correspondingly larger surface area. In this regard, in some embodiments, the porous wall 11 has a mean pore size that is less than a measurement selected from about 100 microns, about 90 microns, about 70 microns, about 50 microns, and about 10 microns. In some embodiments, the porous wall 11 has a mean pore size that is greater than about 0.1 micron, about 2 microns, about 5 microns, about 8 microns, and about 10 microns. In still other embodiments, the porous wall 11 has a mean pore size that is between any suitable combination or sub-range of the aforementioned mean pore sizes (e.g., between about 6 microns and about 20 microns).

In some embodiments, the apparatus 1 further comprises one or more plenums 8. In such embodiments, the plenum can be disposed in any suitable location, including, without limitation, circumferentially to the cylindrical chamber 2. Moreover, while the plenum 8 can perform any suitable function, in some embodiments, the gas is pressurized and introduced into the plenum 8 (e.g., in the direction of arrow 9, through one or more inlets 10). In such embodiments, the pressurized gas enters the chamber 2 through porous wall 11 to develop gas bubbles within the liquid stream 15 as it flows along the inner surface 12 of the chamber 2.

It is appreciated that a variety of gas introduction mechanisms may be provided to communicate with the inner surface 12 of the cylindrical chamber 2. For purposes of description and illustration of the particular embodiment of FIG. 1, however, the plenum 8 envelops the porous wall 11. Moreover, while the plenum 8 can have any suitable characteristic, in some embodiments, the plenum 8 is defined by an outer shell 13, which encloses the hollow cylinder of the porous wall 11. In such embodiments, gas is introduced through a tube 10 (or other conduit) and pressurizes the interior of plenum 8 such that the gas then permeates through the porous wall 11 to develop gas bubbles within liquid stream 15. In some embodiments, sufficient pressure is developed in the plenum 8 to cause the gas within to diffuse through porous wall 11 in the direction of arrows 14, circumferentially of the chamber 2, to thereby orthogonally introduce the gas into flowing liquid stream 15.

As the liquid stream 15 flows along the inner wall 12 of the chamber 2, more and more gas bubbles are introduced into liquid stream 15 and the gas displaces more liquid. Additionally, in some embodiments in which the liquid stream 15 comprises non-bacteria enriched clear water, the ratio of the flow rates of the liquid and the gas into the chamber 2, the length of the porous wall, and/or its permeability are kept in balance by a pressure within the chamber 2 such that when the mixture of gas bubbles and liquid developed within the liquid stream 15 reaches the exit port 6 of the chamber 2, the mixture of the liquid and the gas bubbles has a flow characteristic of liquid and not a froth. In some optional embodiments, the exit velocity of the liquid stream 15 is also significantly higher than the velocity of the liquid entering the chamber 2.

In some embodiments, the pressure of gas in the plenum 8 is optionally sensed by sensor 17. In such embodiments, the sensor 17, which is connected to a pressure controller 18 via input line 19, provides output. In turn, in some embodiments, the controller 18 has output via line 20 to a control valve (e.g., servo-controlled valve 21). By standard feedback techniques, the controller 18 opens and closes the valve (e.g., valve 21) in case of pressure drop so as to stop the flow of liquid into the chamber in order to prevent the liquid from permeating through the porous wall 11 into plenum 8. Thus, in some embodiments, the flow of liquid and gas bubbles is controlled (e.g., via pressure controller 18 and valve 20 or otherwise) so that the ratio of the liquid flow rate to the gas bubble flow rate does not exceed values which convert non-bacteria enriched, clear water into froth. In some embodiments, substantially constant pressure is also maintained within the chamber 2 when it is substantially enclosed even with entry port 4x and exit port 6. Indeed, in some embodiments, pressure within the chamber 2 is maintained substantially constant by the centrifugal effect when there is a substantially constant liquid flow rate and gas flow rate.

Figure 2:
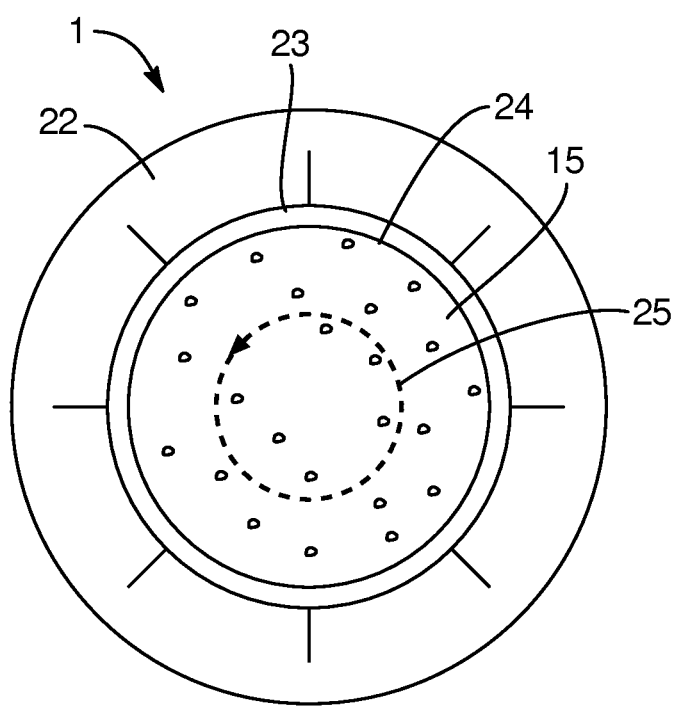
FIG. 2 is a section along the lines AA of a representative embodiment of a chamber for introducing gas bubbles into a swirling slurry in the apparatus of FIG. 1.
Figure 3:
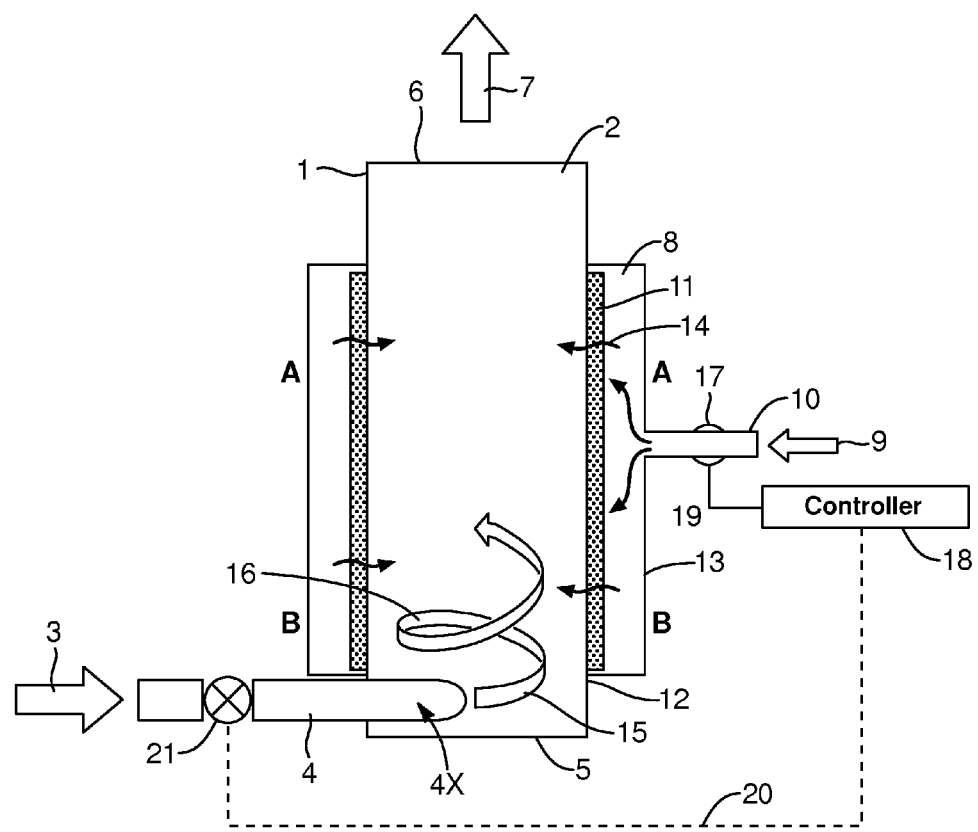
FIG. 3 is a schematic view of a representative embodiment of the apparatus of FIG. 1 with an alternate exit port 6.

While the development and incorporation, inclusion, and/or diffusion of gas bubbles in the liquid stream 15 can be accomplished in any suitable manner, FIG. 2 shows some embodiments illustrating such development and incorporation in accordance with the apparatus 1 of FIG. 1. Specifically, FIG. 2 shows that, in some embodiments, as the apparatus 1 operates, pressurized gas in the plenum 22 permeates through the fine mesh 23 to develop minute bubbles 24 at an inner surface of the mesh. In some embodiments, the previously introduced liquid stream 15 develops a thickness 25 circumferentially around the inner wall of the chamber 2 as the liquid stream 15 flows along the inner wall of mesh 23. In some such embodiments, a vortex of the liquid stream 15 extends centrally of the cylindrical chamber 2, along a longitudinal axis of the chamber. Additionally, in some embodiments, as the gas is introduced through fine mesh 23, it encounters the liquid stream orthogonally, and is sheared into numerous bubbles by the high velocity swirl of the liquid imparted by the vortex.

In some embodiments, the bubble generation mechanism accomplished with fine mesh 23 comprises a two-stage process. First, gas migrates through the micro channels of the fine mesh 23, or porous wall 11. When leaving the pore, gas creates a small cavity. The cavity grows until the gas encounters the liquid stream orthogonally and the shearing force of the flowing liquid is greater than the cavity's surface tension holding it at the pore. In the second stage, once a bubble is sheared off from the surface of the fine mesh 23, or porous wall 11, it begins to flow, and then flows through the liquid to mix with the liquid as a mixture that is carried by turbulent flow to exit port 6.

The gas can be introduced into the liquid stream 15 in the apparatus 1 at any suitable ratio or concentration that allows the flow of the liquid and the gas bubbles to be controlled such that a ratio of the liquid flow rate to the gas bubble flow rate does not exceed values which convert non-bacteria enriched, clear water into froth. In some embodiments, the gas is introduced into the liquid, such that (under the operating conditions of the apparatus 1), the gas is saturated into the liquid in the mixture of liquid and gas bubbles that exit the apparatus 1 at a saturation level depending on the nature of the liquid.

In addition to the aforementioned components and characteristics, the described systems and methods can be modified in any suitable manner that allows the apparatus 1 to diffuse the gas into the liquid as described herein. In one example, FIG. 3 shows that in some embodiments, the exit port 6 is of such a size and shape that it is able to discharge the mixture of liquid and gas bubbles directly outside of the chamber 2 as effectively as if the output end of the chamber were open.

In another example, one or more strains of bacteria are optionally added to the liquid before and/or as the apparatus 1 operates. In such embodiments, any suitable strain of bacteria can be added to the liquid (e.g., the liquid stream 15). Some examples of such bacteria include, but are not limited to, bacteria that are capable of digesting, diffusing, or otherwise degrading hydrocarbons (e.g., heavy hydrocarbons, light hydrocarbons, oils, diesel, biodiesel, gasoline, ethylene glycol, and/or other hydrocarbons), such as *Pseudomonas* (e.g., *Pseudomonas aeruginosa* SB30, *Zooglea, Alkaligenes, Fracteuria, Aeruginosa, P. aeruginosa S*8, etc.), H13a, Pet 1006, *Gordonia amarae, Microthirix parvicella*, Micro50, *flavobacterium, arthrobacter, azotobacter, Alcanivorax borkumensis, Muco-bacterium flavescens* Ex91, etc. In some embodiments, the bacteria include bacteria, such as *Pseudomonas aeruginosa* $NY_3$, and/or those bacteria that produce one or more biosurfactants or microbial compounds that exhibit particularly high surface activity and/or emulsifying activity, and that can reduce surface and interfacial tension at interfaces between liquids, solids, and gases, thereby allowing them to mix or disperse readily in water or other liquids.

Indeed, in some embodiments in which bacteria are added to the liquid stream 15, the bacteria comprise surfactant-producing bacteria that produce a surfactant (i.e., ionic and/or non-ionic surfactant) that alters the surface tension of the bubbles formed in the apparatus 1. As a result, in some embodiments, such bacteria allow the bubbles and the liquid in the liquid stream 15 to form a froth in the mixture of liquid and gas bubbles that exit the apparatus 1—even when the ratio of liquid flow rate to gas bubble flow rate in the device does not exceed values which convert non-bacteria enriched, clear water into froth. Some non-limiting examples of such bacteria include mesophilic, psychrophilic, and thermophilic. As the stability of some embodiments of the froth can be proportional (e.g., directly proportional) to the type of bacteria in the stream, in some instances, the specific bacteria added to the stream are selected to obtain a froth with a desired stability.

Additionally, in some embodiments in which the liquid stream 15 comprises surfactant-producing bacteria such that the mixture of liquid and gas bubbles that exits the apparatus comprises a froth, the froth can be a gas-rich froth which provides a suitable environment for the bacteria. By way of non-limiting example, where the gas comprises oxygen, the apparatus can be used to produce an oxygen-rich froth that is compatible with some forms of bacteria.

Where the mixture of liquid and gas bubbles that exits the apparatus 1 comprises a froth (e.g., formed by surfactant produced by surfactant-producing bacteria), the bubbles in the froth can be any suitable size. Indeed, in some embodiments, the bubbles in the froth have an average diameter that is smaller than a measurement selected from about 100 μm, about 1 mm, about 1 cm, and about 3 cm. In some embodiments, the bubbles in the froth have an average diameter that is larger than a measurement selected from 1 nm, 1 μm, 10 μm, and 100 μm. In still other embodiments, the bubbles in the froth have an average diameter between any suitable combination or sub-range of the aforementioned diameters (e.g., between about 1 nm and about 100 μm, and even several centimeters).

In some embodiments in which bacteria are added to the liquid stream 15, the bacteria comprise bacteria that do not produce a surfactant (or non-surfactant-producing bacteria). In such embodiments, the bacteria can comprise virtually any desired bacteria that do not produce a surfactant. In such embodiments, one or more desired strains of bacteria (e.g., an oil eating bacteria) can be added to the liquid without forming a froth (or forming relatively little froth) as the apparatus 1 functions.

Where bacteria are added to the liquid stream 15, the bacteria can be added to the stream in any suitable manner. In some embodiments, the bacteria are added to the liquid before introduction into the apparatus 1 and/or while the liquid journeys through the apparatus (e.g., via a conduit, such as siphon hose, a tube connected to a pump, or other device that is in communication with a bacterial supply and the chamber 2).

Where bacteria are added to the liquid, any suitable amount of the bacteria can be added into the liquid stream 15. In this regard, the mixture of liquid and bubbles that exits the apparatus 1 can have any suitable concentration of bacteria. Indeed, in some embodiments, the mixture comprises a concentration as high as an amount selected from about $10^2$ cells per liter, about $10^4$ cells per liter, about $10^6$ cells per liter, about $10^9$ cells per liter, and about $10^{11}$ cells per liter. In other embodiments, the mixture comprises a concentration of bacteria as low as about an amount selected from about 1 cell per liter, about 1 cell per liter, and about 70 cells per liter, and about 140 cells per liter. In still other embodiments, the mixture of liquid and bubbles that exits the apparatus 1 can have any suitable combination or sub-range of the aforementioned bacterial concentrations.

In some embodiments, bacterial nutrients are optionally added to the liquid stream 15. In such embodiments, the nutrients can serve any suitable function, including, without limitation, feeding bacteria present in the liquid stream and/or feeding bacteria that are already present at an application site (e.g., a body of contaminated water) of the mixture that exits the apparatus 1. While any suitable nutrient can be added to the liquid stream, some examples of such nutrients include, but are not limited to, acetate; hexadexcane; glucose; glycerol; ammonium salts; nitrates; yeast extract; caseing hydrolysate; sodium chloride; beef-extract; peptone; succinate; magnesium; nitrogen; phosphorous; amino acids; other sources of carbon, nitrogen, phosphorus, sulfur, metal ions, and/or other nutrients; and/or any other material that is capable of sustaining bacteria.

Where bacterial nutrients are added to the liquid stream 15, the nutrients can be added at any suitable concentration that allows bacteria (e.g., in the stream and/or at an application site) to survive and/or grow or even flourish.

Where the mixture that exits the apparatus 1 comprises bacteria and/or bacterial nutrients, the mixture can be used for any suitable purpose, including, without limitation, for: oil spill bioremediation; oil spill dispersion (both inland and at sea); the removal, reduction, and/or mobilization of oil, oil sludge, diesel-range petroleum, semi-volatile petroleum, and/or other hydrocarbons or contaminating substances from surfaces (e.g., storage tanks, pipes, vessels, machinery, equipment, gravel, shorelines, soil, etc.); enhanced oil recovery; water treatment; aeration; reducing the concentration of individual or mixed environmental contaminants; recovering hydrocarbons from emulsified sludge; the emulsification of hydrocarbon-water mixtures; the degradation of hydrocarbons in the environment; re-entraining volatile organic compounds ("VOCs"); reducing odors (e.g., of VOCs); the treatment of wastewater (e.g., from slaughter houses, feed lots, or any other source); the formation of herbicides and/or pesticides; the formation of stable oil-in-water emulsions for the food and cosmetic industries, medical, agricultural, and/or industrial industries, and/or any other application that can benefit from the presence of specific bacteria.

Where the mixture that exits the apparatus 1 comprises bacteria and/or bacterial nutrients, the mixture can be applied in any suitable location, including, without limitation, in an in situ environment (e.g., at a body of water (such as the ocean, a lake, river, stream, pond, lagoon, well, etc.), a shoreline, stored contaminated soils, spills of contaminated material, or any other natural environment), a bioreactor (e.g., a storage tank, storage pond, sequential batch reactor, etc.), and/or ex situ site (e.g., a site to which contaminated materials (such as soil, water, etc.) are taken and treated off site from the place where the contamination occurred).

In some embodiments, in which the mixture of liquid and bubbles that exits the apparatus 1 comprises a froth (e.g., where the liquid stream 15 comprises surfactant-producing bacteria), the froth can be used for any suitable purpose. In some embodiments, the froth is applied as a cover or a cap to at least a portion of a body of water. Indeed, in some cases in which the water comprises one or more VOCs, a layer of the froth can trap such VOCs in an aerobic environment and re-entrain such VOCs into the water, thereby, reducing (if not eliminating) the odors released into the environment by the VOCs.

In addition to the aforementioned ingredients, any other suitable ingredient can be added to the liquid or gas streams, including, without limitation, one or more yeasts, fungi, bacteria, disinfectants, gas, aerosol, conditioner, degreaser, soaps, aromatic conditioners, polymers, frothers, chemicals to adjust the pH of the liquid stream (e.g., HCL, NaOH, etc.) for improved bacterial growth, etc. Moreover, in some embodiments, the specific bacteria, gas, liquid, nutrients, pH, concentrations, temperature, and/or other operating conditions of the apparatus 1 are modifiable to allow the mixture of liquid and gas bubbles that exits the chamber to be tailored for specific uses and sites for application. For example, a sequential batch reactor with multiple reactors can be treated to eliminate pathogens with a mixture of liquid and gas bubbles containing disinfectants.

As discussed herein, the described systems and methods can have many beneficial characteristics. In one example, unlike some conventional aeration devices that are operable (e.g., fully functional) only in a limited number of orientations, some embodiments of the described apparatus 1 are operable in any and all orientations. As a result, such embodiments can be used in some locations in which competing devices cannot (at least not as easily). Accordingly, some such embodiments of the apparatus may be readily retrofitted to systems that would require additional modifications if they were to be retrofit with some conventional aerating devices.

In another example, unlike many synthetic, mainly petroleum-based, chemical surfactants (which are often toxic to the environment and non-biodegradable), many surfactants produced by bacteria (or biosurfactants) are biodegradable and non-toxic or less toxic than synthetic surfactants. Additionally, some biosurfactants are more effective at extreme temperatures or pHs than are some of their chemically-synthesized counterparts. As a result, the described systems and methods may be more effective, safer, and result in less waste (e.g., non-biodegradable sludge) than some competing processes.

In another example, in some embodiments in which the liquid stream 15 comprises bacteria and the mixture of the liquid and gas that exits the apparatus 1 is applied to an application site, the bacteria (e.g., surfactant-producing bacteria) can: increase the surface area of hydrophobic water-insoluble growth substrates at the application site, increase the bioavailability of certain organic compounds, increase the bioavailability of hydrophobic substrates at the site by increasing their apparent solubility and/or desorbing them from substrates, and/or regulate the attachment and detachment of microorganisms to and from such substrates. As a result, such a mixture of the liquid and gas bubbles may greatly improve the biodegradation of contaminants (e.g., hydrocarbons) at the application site.

In still another example, some embodiments of the described systems and methods can be relatively inexpensive to use and, perhaps more importantly, can be tailored to be specific for certain contaminants, application sites, and operating conditions.

The following examples are given to illustrate an embodiment within the scope of the present invention. These are given by way of example only, and it is understood that the following examples are not comprehensive or exhaustive of the many types of embodiments of the present invention in accordance with the present invention.

EXAMPLES

In a first example, the apparatus 1 was used to aerate a fishpond for 94 hours. In this example, the apparatus pumped approximately 850 cubic meters with a 1:3 water to air ratio. The measurements of the dissolved oxygen in the fishpond were taken every 8 hours. In this regard, the initial 2.76 ppm (mg/l), DO (dissolved oxygen) raised linearly to 6.62 ppm (mg/l) DO at the end of the 94-hour period.

In a second example, the described apparatus 1 was taken to body of water that was contaminated with ethylene glycol and oil. Upon initial observation of the body of water, it was determined that one or more VOCs were present in the water and emanating a strong odor. When the apparatus 1 was operated using contaminated water (from the body of water) as the liquid that was introduced into the apparatus 1, little to no froth was produced by the apparatus 1. As a result, it was theorized that there was little bacteria present in the contaminated water, and/or that the bacteria in the contaminated water was producing little to no surfactant. As the experiment continued, an injection pump was used to inject Micro50 (an oil eating bacteria) into the stream of liquid entering the apparatus 1. Once the Micro50 was injected, the apparatus 1 instantly produced a relatively strong and stable froth. When that froth was applied to the body of water, it was observed that the froth created a cap that greatly reduced odor from the volatile organic compounds. Additionally, it was observed that bubbles on the surface of the water began to include bright colors of red, blue, and yellow—showing that the oils in the water were being degraded. Moreover, it was observed that after just 4 hours after contacting the application site with the bacteria-laden froth, manufactured oil layers on the water and rocks on the water's shoreline were substantially, if not completely, removed.

Thus, some embodiments of the present invention relate to systems and methods for diffusing gas into a liquid by creating and maintaining conditions that create a mixture of the liquid and bubbles of the gas. In some non-limiting embodiments, the described systems and methods also include adding bacteria and/or bacterial nutrients to the liquid (e.g., to assist in bioremediation). The present invention may be embodied in other specific forms without departing from its spirit or essential characteristics. The described embodiments and examples are all to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A process for diffusing gas bubbles in a liquid, the process comprising:
   i) introducing a stream of the liquid into a cylindrical chamber having a cylindrical inner wall, and enclosed at a first end, the stream being introduced tangentially at an input zone near the first end of the chamber in a manner to develop a spiral flow of the stream along the cylindrical inner wall toward an opposite, output end of the chamber, wherein the stream comprises at least one of clear water and a fluid enriched with bacteria,
   ii) introducing gas into the stream during at least a portion of its travel in the chamber, the gas being introduced to the stream orthogonally through means located at the chamber inner wall for developing gas bubbles which move into the stream,
   iii) controlling a flow of the liquid and the gas bubbles so that a ratio of liquid flow rate to gas bubble flow rate does not exceed values which convert non-bacteria enriched, clear water into froth,
   iv) the chamber being of a length sufficient to provide a residence time in the chamber which permits a diffusion of the gas in the liquid, and
   v) allowing a mixture of the liquid and the gas bubbles to exit the chamber near the output end.

2. The process of claim 1, wherein the stream comprises the fluid enriched with bacteria, and wherein the bacteria comprises a surfactant-producing bacteria that is capable of producing a surfactant that alters a surface tension of the gas bubbles such that the mixture of liquid and gas bubbles comprises a froth as it exits the chamber.

3. The process of claim 1, further comprising adding bacterial nutrients to the stream.

4. The process of claim 2, wherein the gas comprises oxygen.

5. The process of claim 1, wherein the stream comprises the fluid enhanced with bacteria, and wherein the bacteria comprises a non-surfactant-producing bacteria, such that the mixture of the liquid and the gas bubbles exits the chamber substantially free of froth.

6. The process of claim 1, wherein the chamber is operable in any and all orientations.

7. A process for diffusing gas bubbles in a liquid, the process comprising:
   i) introducing a stream of the liquid into a cylindrical chamber having a cylindrical inner wall, and enclosed at a first end, the stream being introduced tangentially at an input zone near the first end of the chamber in a manner to develop a spiral flow of the stream along the cylindrical inner wall toward an opposite, output end of the chamber, wherein the stream comprises clear water,
   ii) introducing gas into the stream during at least a portion of its travel in the chamber, the gas being introduced to the stream orthogonally through means located at the chamber inner wall for developing gas bubbles which move into the stream,
   iii) controlling a flow of the liquid and the gas bubbles so that a ratio of liquid flow rate to gas bubble flow rate does not exceed values which convert non-bacteria enriched, clear water into froth,
   iv) the chamber being of a length sufficient to provide a residence time in the chamber which permits a diffusion of the gas in the liquid, and
   v) allowing a mixture of the liquid and the gas bubbles to exit the chamber near the output end.

8. The process of claim 7, further comprising adding surfactant-producing bacteria to the stream, wherein the surfactant-producing bacteria produces a surfactant that alters a surface tension of the gas bubbles such that the mixture of liquid and gas bubbles comprises a froth as it exits the chamber.

9. The process of claim 7, further comprising adding a non-surfactant-producing bacteria to the stream, such that the mixture of the liquid and the gas bubbles exits the chamber substantially free of froth.

10. The process of claim 7, further comprising applying the froth to an application site.

11. The process of claim 10, wherein the application site comprises an in situ site.

12. The process of claim 10, wherein the application site comprises a surface of a body of water.

13. The process of claim 12, wherein the body of water comprises a volatile organic compound, and wherein the froth traps a portion of the volatile organic compound in an aerobic environment, re-entrains the portion of the volatile organic compound into the body of water, and reduces odors being released into the atmosphere from the portion of the volatile organic compound.

14. The process of claim 7, wherein the introduction of gas into the stream during at least a portion of its travel in the chamber produces a gas-rich froth that enhances an environment for bacteria.

15. The process of claim 14, wherein the gas comprises oxygen and the gas-rich froth comprises an oxygen-rich froth.

16. The process of claim 7, further comprising adding bacterial nutrients to the stream.

17. The process of claim 7, wherein the chamber is operable in any and all orientations.

18. A process for diffusing gas bubbles in a liquid, the process comprising:
   i) introducing a stream of the liquid into a cylindrical chamber having a cylindrical inner wall, and enclosed at a first end, the stream being introduced tangentially at an input zone near the first end of the chamber in a manner to develop a spiral flow of the stream along the cylindrical inner wall toward an opposite, output end of the chamber,
   ii) introducing gas into the stream during at least a portion of its travel in the chamber, the gas being introduced to the stream orthogonally through means located at the chamber inner wall for developing gas bubbles which move into the stream,
   iii) adding bacteria to the stream, wherein the bacteria is selected from a surfactant-producing bacteria and a non-surfactant-producing bacteria,
   iv) controlling a flow of the liquid and the gas bubbles so that a ratio of liquid flow rate to gas bubble flow rate does not exceed values which convert non-bacteria enriched, clear water into froth,
   v) the chamber being of a length sufficient to provide a residence time in the chamber which permits a diffusion of the gas in the liquid, and
   vi) allowing a mixture of the liquid and the gas bubbles to exit the chamber near the output end.

19. The process of claim 18, wherein the bacteria comprises the surfactant-producing bacteria, and the surfactant-producing bacteria produce a surfactant that alters a surface tension of the gas bubbles such that the mixture of liquid and gas bubbles comprises a froth as it exits the chamber.

20. The process of claim 18, wherein the bacteria comprises the non-surfactant-producing bacteria, such that the mixture of the liquid and the gas bubbles exits the chamber substantially free of froth.

21. The process of claim 18, further comprising adding bacterial nutrients to the stream to enhance a multiplication of the bacteria.

22. The process of claim 18, wherein the stream comprises clear water.

23. The process of claim 18, wherein the chamber is operable in any and all orientations.

* * * * *